(12) United States Patent
Pepe

(10) Patent No.: US 7,787,162 B2
(45) Date of Patent: Aug. 31, 2010

(54) SMART START OF SCAN (SOS) DETECTOR

(75) Inventor: Martin Pepe, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 958 days.

(21) Appl. No.: 11/601,330

(22) Filed: Nov. 16, 2006

(65) Prior Publication Data

US 2008/0117280 A1 May 22, 2008

(51) Int. Cl.
*H04N 1/04* (2006.01)
*G01D 15/14* (2006.01)

(52) U.S. Cl. .................. 358/514; 358/480; 358/475; 347/224

(58) Field of Classification Search ............... 382/232, 382/322, 318, 312; 358/1.2, 1.7, 493, 509, 358/510, 475, 480; 347/250, 224; 399/220; 250/200, 552, 559.04, 216, 559.16, 227.11, 250/227.14, 227.19
See application file for complete search history.

(56) References Cited

U.S. PATENT DOCUMENTS

| | | | |
|---|---|---|---|
| 4,818,098 A * | 4/1989 | Kahn et al. .................. 353/122 |
| 5,438,354 A | 8/1995 | Genovese ................... 347/256 |
| 5,750,986 A | 5/1998 | Genovese ................... 250/235 |
| 5,818,507 A | 10/1998 | Genovese ................... 347/261 |
| 6,344,866 B1 | 2/2002 | Komiya et al. .............. 347/133 |
| 2003/0178395 A1 * | 9/2003 | Duignan ................. 219/121.68 |
| 2004/0256573 A1 * | 12/2004 | Mollica .................... 250/492.1 |
| 2005/0146714 A1 * | 7/2005 | Kitamura et al. .......... 356/237.2 |
| 2007/0192850 A1 * | 8/2007 | Cowburn ..................... 726/20 |

* cited by examiner

*Primary Examiner*—Jerome Grant, II
(74) *Attorney, Agent, or Firm*—Luis M. Ortiz; Kermit D. Lopez; Melissa A. Asfahani

(57) ABSTRACT

A technique for achieving a smart start of scan (SOS) detector that is related with line scan timing on raster output scanners by expanding the available functions to include beam size and position. A start of scan detection system adapted to provide beam size and position control. The system includes a CPU, a data source and laser driver managed by the CPU, and a multiple element pre-patterned detector managed by the CPU and enabling a sensor pattern through which laser beams from the laser driver are passed and detected. According to a method for managing beam size and position in a image processing system, a multiple element pre-patterned detector adapted to enable a sensor pattern is provided wherein at least one laser beam is passed through said sensor pattern enabled by the multiple element pre-patterned detector, analyzed and used by the image processing system to adjust beam size and position.

10 Claims, 5 Drawing Sheets

SMART START OF SCAN (SOS) DETECTOR

TECHNICAL FIELD

Embodiments are generally related to image data processing. Embodiments are also related to the field of laser scanning. Embodiments are additionally related to start of scan (SOS) detection.

BACKGROUND OF THE INVENTION

Many processes and devices have been used for electro photographic printers wherein a laser scan line is projected onto a photoconductive surface. In the case of laser printers, facsimile machines, and the like, it is common to employ a raster output scanner (ROS) as the source of signals to be imaged on a pre-charged photoreceptor for purposes of xerographic printing. The ROS provides a laser beam which switches on and off as it moves, or scans, across the photoreceptor. Commonly, the surface of the photoreceptor is selectively imagewise discharged by the laser in locations to be printed, to form the desired image on the photoreceptor. On-and-off control of the beam to create the desired latent image on the photoreceptor is facilitated by digital electronic data controlling the laser source. Once a latent image is formed on the photoreceptor, the latent image is subsequently developed with a toner, and the developed image is transferred to a copy sheet, as in the well-known process of xerography.

Prior art laser scanning is based on techniques for achieving both start-of-scan detection and dynamic beam intensity regulation in a multiple laser beam raster output scanner using a single photodetector. The raster output scanner includes a source or sources of a plurality of laser beams, a rotating polygon having at least one reflecting facet for sweeping the laser beams to form a scan line path, and a photodetector for receiving illumination from the multiple laser beams and for converting those beams into beam-dependent electrical currents. The raster output scanner further includes a scan detection circuit for producing a start-of-scan signal from the beam dependent current, and a beam intensity circuit for producing an electrical output signal which depends upon the difference in beam intensity of at least two of the laser beams. Ideally, the raster output scanner also includes an optical fiber that collects a portion of the light flux in the sweeping laser beams which directs the light flux onto the photodetector.

A drawback in prior art laser scanning is typically with start of scan detectors (SOS) that have been used for line scan timing on Raster output Scanners (ROS). FIG. 1 illustrates a typical SOS 100 including a sensor pattern 104 through which a light beam 102 is passed. The TP1 106 and TP2 108 are configured with the sensor pattern and the comparator 110. The output 112 is interfaced with the traditional SOS. The graphical representation is shown with the input 114 and the graphs showing the curves of TP1 116 and TP2 118 and forming the output graph 120. Occasionally, SOS detectors are also used for power (μWatts, energy) detection in the output of ROS designs.

The production of a start-of-scan signal and the regulation of the intensities of multiple laser beams can be carried out independently, with separate photodetectors and separate preamplifiers for each. This substantially increases costs and manufacturing and assembly overhead while reducing overall system reliability. Therefore, a technique for achieving start-of-scan detection and dynamic beam intensity regulation of multiple element pre-patterned detectors using photodetector element would be beneficial. Furthermore, such a technique that can be used with a power detection function would be even more beneficial.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved image processing and xerography systems.

It is another aspect of the present invention to provide for an improved performance in a xerographic system.

It is a further aspect of the present invention to provide for a more functional start of scan (SOS) detector.

The aforementioned aspects and other objectives and advantages can now be achieved as described herein. This solution expands the above functions to include beam size and position. Additionally, the power detect function is added without the addition of external timing or process speed requirements. A start of scan detection system adapted to provide beam size and position control.

The system includes a CPU, a data source and laser driver managed by the CPU, and a multiple element pre-patterned detector managed by the CPU and enabling a sensor pattern through which laser beams from the laser driver are passed and detected.

According to a method for managing beam size and position in a image processing system, a multiple element pre-patterned detector adapted to enable a sensor pattern is provided wherein at least one laser beam is passed through said sensor pattern enabled by the multiple element pre-patterned detector, analyzed and used by the image processing system to adjust beam size and position.

Accordingly, a multiple element 'pre-patterned' detector can used for spot size detection, timing, beam steering, and alignment. The generated light beam is passed through the sensor pattern. Therefore three types of beams are formed: beam high, beam ok and beam low. The beams are sent through the sensor pattern. The beam high and beam low are set up and passed through the sensing cell and the sensor pattern.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1A:
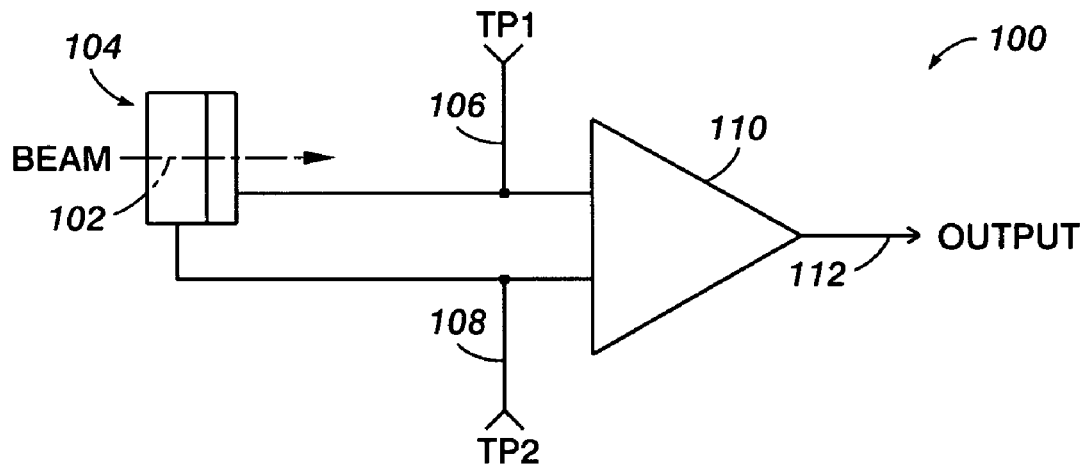
FIG. 1 illustrates a prior art smart start of scan (SOS) including a sensor pattern through which a light beam is passed.
Figure 1B:
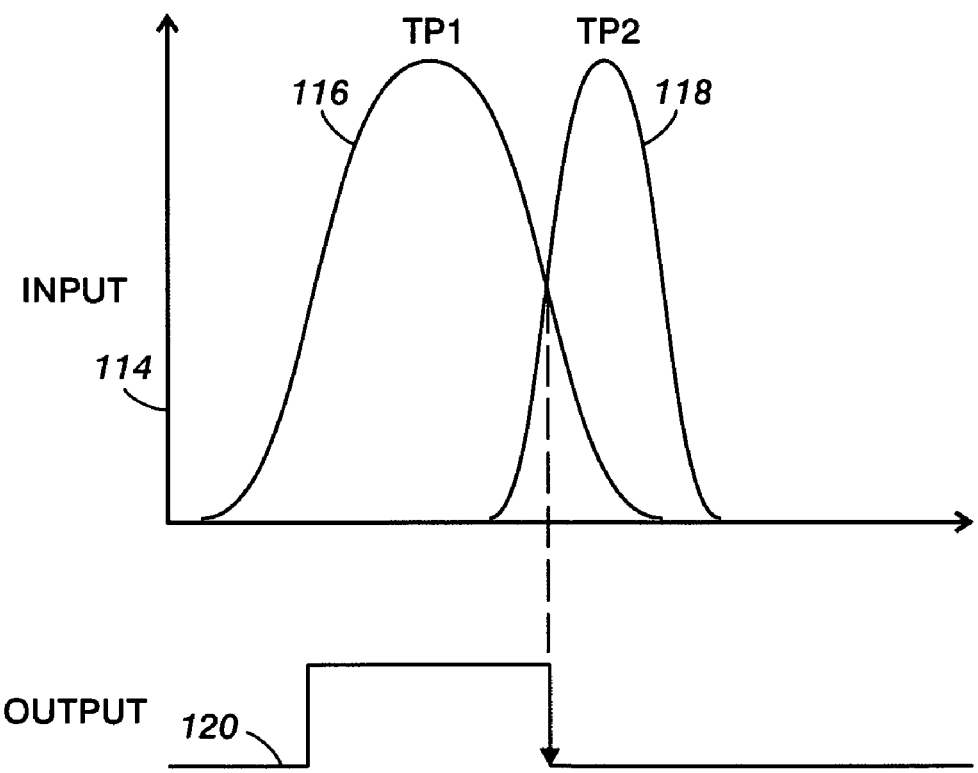
Figure 2:
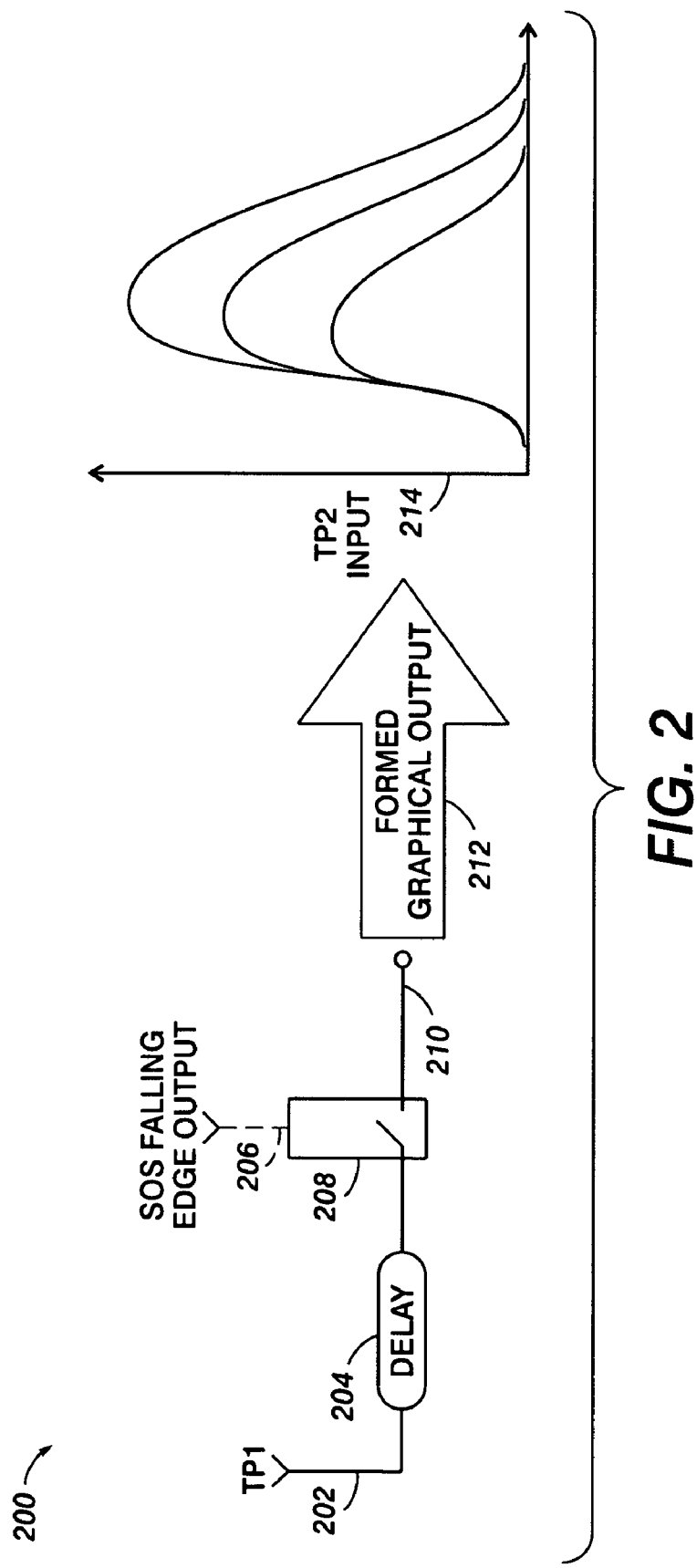
FIG. 2 illustrates a circuit diagram with power detect function, for smart SOS detectors, in which a preferred embodiment can be implemented.

Referring to FIG. 2 illustrated is a circuit diagram 200 with power detect function for smart start of scan (SOS) detectors in which a preferred embodiment can be implemented. The TP2 input unit 202 is connected with a delay circuitry unit 204. Then the configuration to the SOS hold gate 208 is enables the help of the delay unit. The SOS hold gate then sets up the output based on the TP2 input wherein the output is based on the SOS falling edge output 306 and the power height detect 210. The formed graphical output 212 is shown with reference to the circuit in which the TP2 input is analyzed.

Figure 3:
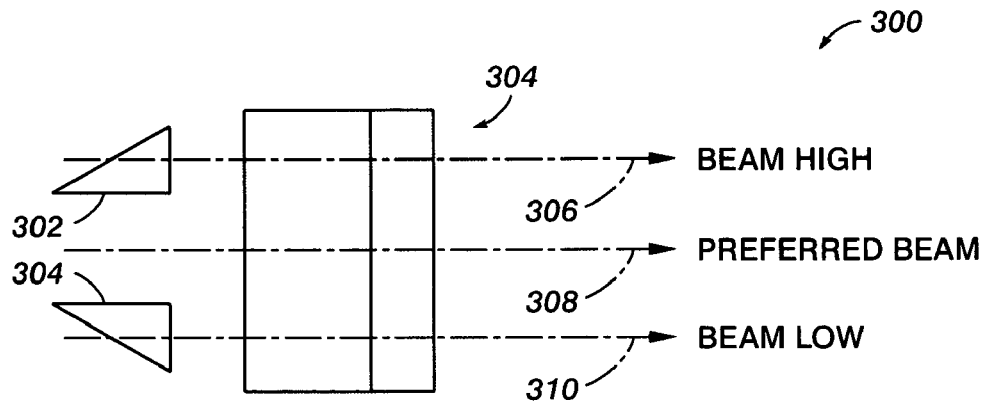
FIG. 3 illustrates a perspective view of a multiple element 'pre-patterned' detector, for SOS detectors, which can be implemented in accordance with a preferred embodiment.

Referring to FIG. 3 illustrated is a perspective view 300 of a multiple element 'pre-patterned' detector that can be associated with a smart start of scan (SOS) detector in accordance with a preferred embodiment. A multiple element 'pre-patterned' detector can be used for spot size detection, timing, beam steering, and alignment. The generated light beam is passed through the sensor pattern 304. Therefore three types of beams can be formed, beam high 306, beam ok 308 and beam low 310, that are sent through the sensor pattern. The beam high and beam low can be set up and passed through the sensing cell 402 and the sensor pattern. Cost of manufacturing a multiple element pre-patterned detector are extremely low since it can be grown on a single wafer.

Figure 4:
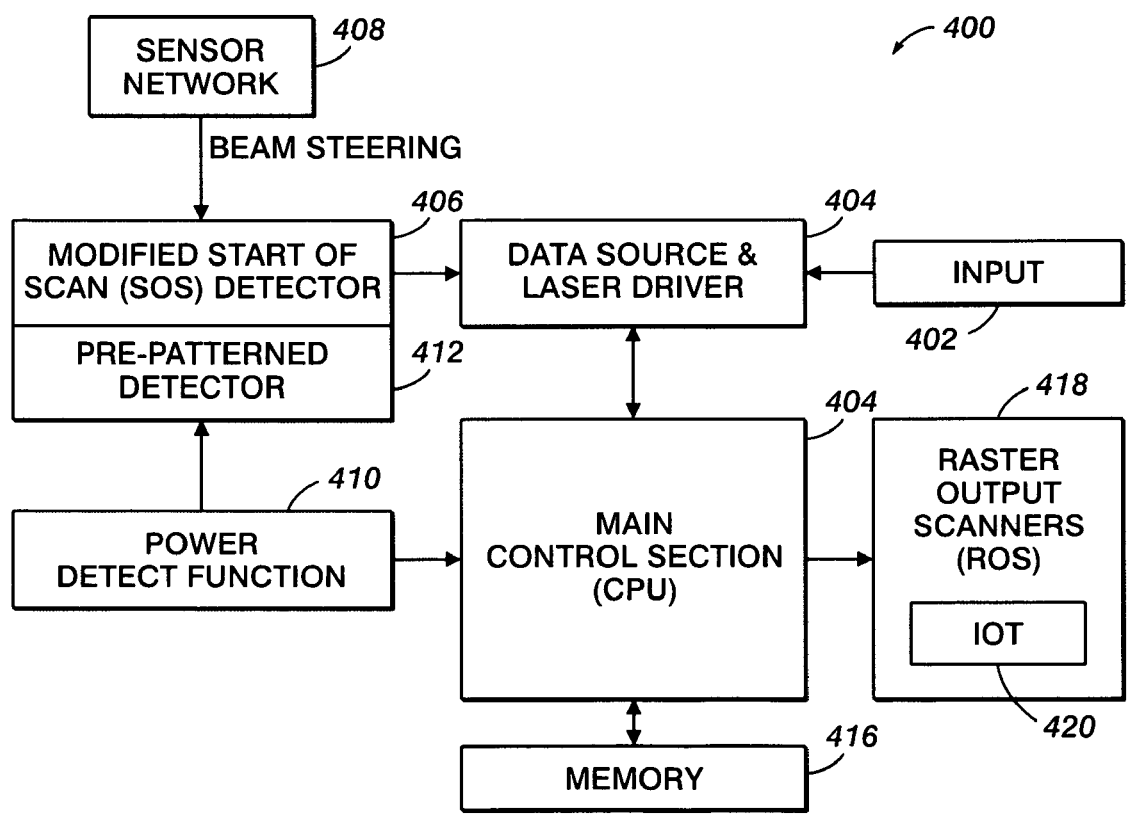
FIG. 4 illustrates a block diagram of the system including a smart SOS detector, which can be implemented in accordance with a preferred embodiment.

Referring to FIG. 4, a block diagram is illustrated of an exemplary xerography system 400 including a smart start of scan (SOS) detector 406, which can be modified in accordance with a preferred embodiment. The input interface 402 for data processing can be setup with the data source and laser driver 404. The sensor network 408 can manage beam steering of a formed laser beam and send it to the start of scan (SOS) detector 406 wherein it can be configured to the data source and laser driver 404. The whole functionality of the system can be set up with the main control section (CPU) 414 and attached to a memory unit 416. The main control section (CPU) can be mainly configured with the power detect function 410, data source and laser driver 404 and also the raster output scanners (ROS) 418, wherein an image output terminal (IOT) 420 can be set for output data processing. The start of scan (SOS) detector 406 can be enabled with a power detect function and is where a multiple element pre-patterned detector 412 can be integrated or coupled.

Figure 5:
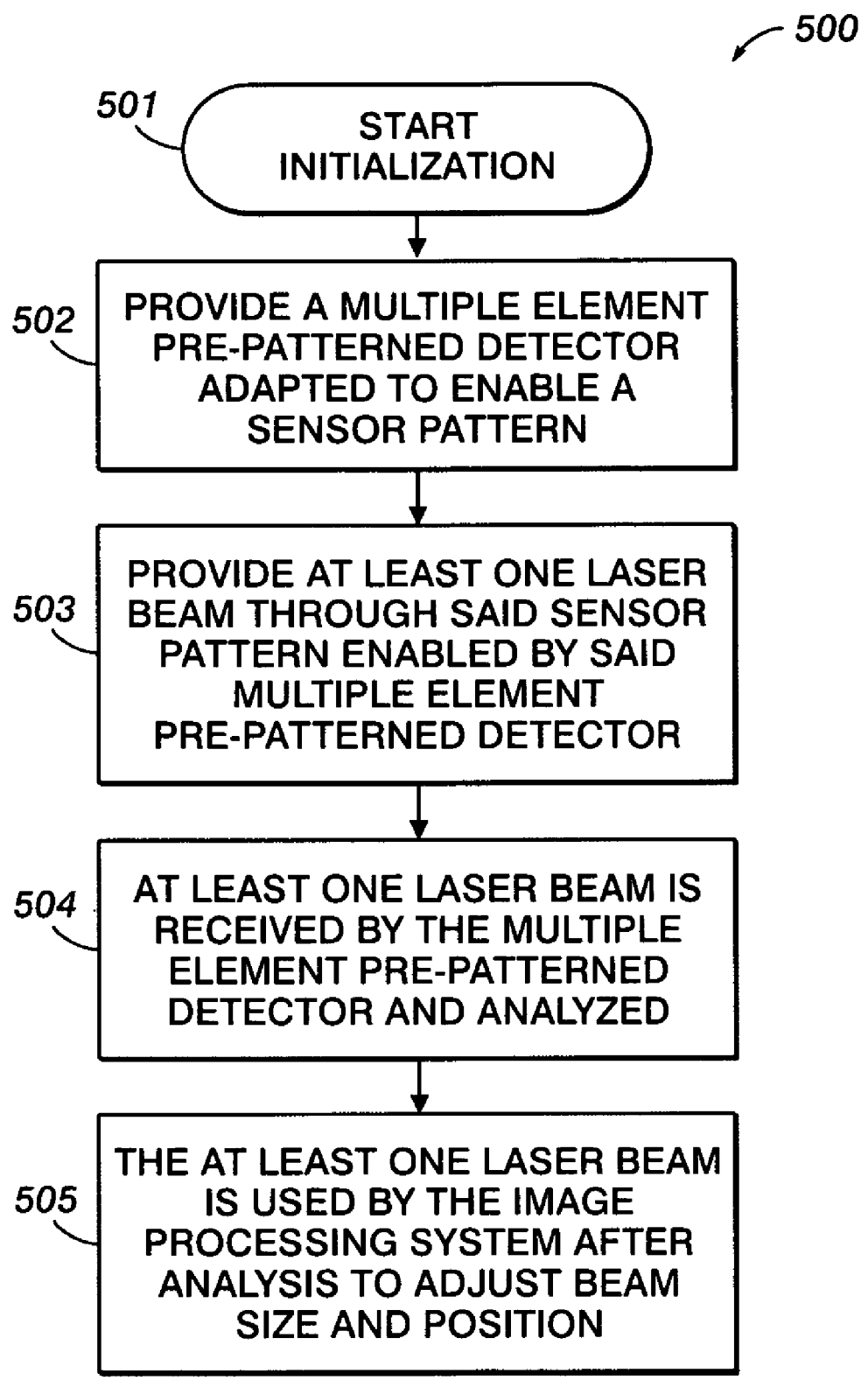
FIG. 5 illustrates a high level flow chart, illustrating the functional steps with SOS) detector, in accordance with a preferred embodiment.

Referring to FIG. 5, a high-level flow chart 500 showing the functional steps of using a modified smart start of scan (SOS) detector in accordance with a preferred embodiment. As depicted at block 501, initialization of a xerography system occurs. Next, as described at block 502 a multiple element pre-patterned detector is adapted to enable a sensor pattern is provided. In step 503 at least one laser beam is provided through a sensor pattern enabled by the multiple element pre-patterned detector. As shown in block 504, the least one laser beam is received by the multiple element pre-patterned detector wherein it is analyzed. As shown in block 505 the image processing system uses the at least one laser beam after it is analyzed to adjust beam size and position.

For power initialization the power detect function can also be added without the addition of external timing with at least one process speed requirements with power detection in the output of ROS designs. The function can be grown in a single wafer. Expanded functions with spit cell detectors can also be enabled. The multiple element pre-patterned detector can also be set up for spot size detection, beam timing, beam steering and proper alignment.

Figure 6:
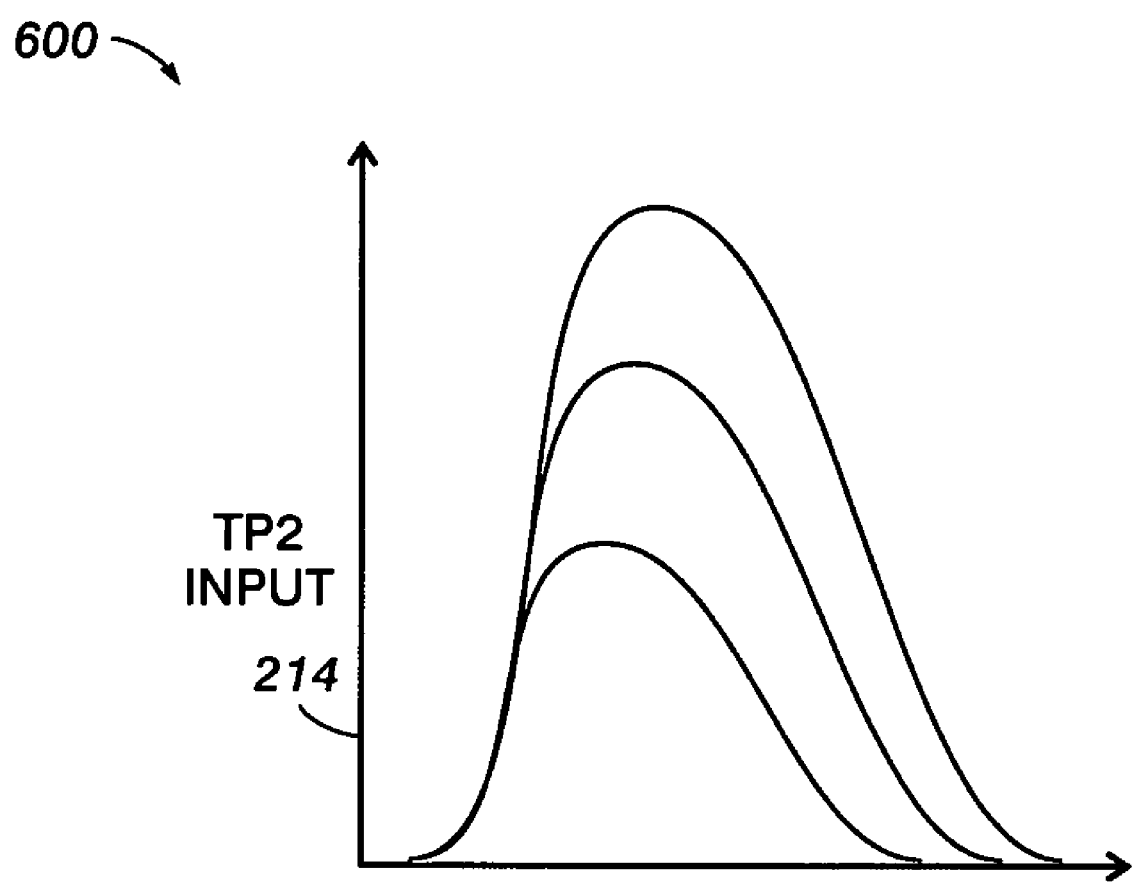
FIG. 6 illustrates the graphical representation of the input of sensor patterns with a SOS detector, in accordance with a preferred embodiment.

Referring to FIG. 6 illustrates the graphical representation 600 of the input of sensor patterns with smart start of scan (SOS) detectors in accordance with a preferred embodiment. The TP2 input 212 is shown in the graph.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A start of scan detection system adapted to provide beam size and position control within an image processing system, comprising:
   a CPU and/or wired logic;
   a data source and laser driver managed by the CPU;
   a multiple element pre-patterned detector managed by the CPU and adapted to enable a sensor pattern through which laser beams from said laser driver are received and detected; and
   a power detect function that enables said multiple element pre-patterned detector.

2. The system of claim 1 wherein the said multiple element pre-patterned detector is also adapted for use for at least one of: spot size detection, timing, beam steering or beam alignment.

3. The system of claim 1 wherein the said multiple element pre-patterned detector is grown on a single wafer and includes split cells.

4. The system of claim 1 wherein the said multiple element pre-patterned detector associated with said image processing system is used for detecting beam size and position.

5. The system of claim 4 wherein said multiple element pre-patterned detector also detects and analyzes at least one of: spot size, timing, beam steering, and beam alignment.

6. A method for managing beam size and position in an image processing system, the method comprising:
   providing a multiple element pre-patterned detector adapted to enable a sensor pattern; and
   providing at least one laser beam through said sensor pattern enabled by said multiple element pre-patterned detector, where through said at least one laser beam is received by the multiple element pre-patterned detector, analyzed and used by the image processing system to adjust beam size and position and to detect power.

7. The method of claim 6 wherein said at least one laser beam is also received by the multiple element pre-patterned detector, analyzed and used by the image processing system to detect spot size.

8. The method of claim 6 wherein said at least one laser beam is also received by the multiple element pre-patterned detector, analyzed and used by the image processing system to detect timing.

9. The method of claim 6 wherein said at least one laser beam is also received by the multiple element pre-patterned detector, analyzed and used by the image processing system to detect beam steering.

10. The method of claim 6 wherein said at least one laser beam is also received by the multiple element pre-patterned detector, analyzed and used by the image processing system to detect beam alignment.

* * * * *